US008160041B2

(12) United States Patent
Nakashima (10) Patent No.: US 8,160,041 B2
(45) Date of Patent: Apr. 17, 2012

(54) RADIO COMMUNICATION TERMINAL AND RADIO COMMUNICATION SYSTEM

(75) Inventor: Jun Nakashima, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 341 days.

(21) Appl. No.: 12/591,291

(22) Filed: Nov. 16, 2009

(65) Prior Publication Data

US 2010/0226306 A1  Sep. 9, 2010

(30) Foreign Application Priority Data

Mar. 9, 2009  (JP) ................................. 2009-054814

(51) Int. Cl.
   *H04W 4/00*  (2009.01)
(52) U.S. Cl. ........................................ 370/338
(58) Field of Classification Search .................... None
   See application file for complete search history.

(56) References Cited

U.S. PATENT DOCUMENTS

| 8,027,289 | B2 * | 9/2011 | Ramanathan et al. | 370/328 |
| 8,032,746 | B2 * | 10/2011 | Boppana et al. | 713/168 |
| 2003/0033394 | A1 * | 2/2003 | Stine | 709/222 |
| 2005/0030921 | A1 * | 2/2005 | Yau | 370/329 |

OTHER PUBLICATIONS

Yih-Chun Hu, Adrian Perrig, David B. Johnson, "Packet Leashes: A Defense against Wormhole Attacks in Wireless Ad Hoc Networks", Proc of INFOCOM 2003, San Francisco, CA, USA, Apr. 2003.

L. Lazos, R. Poovendran, C. Meadows, P. Syverson, L.W. Chang, "Preventing Wormhole Attacks on Wireless Ad Hoc Networks: A Graph Theoretic Approach", Wireless Communications and Networking Conference, 2005 IEEE, 1193-1199 vol. 2.

* cited by examiner

*Primary Examiner* — Anh-Vu Ly
(74) *Attorney, Agent, or Firm* — Rabin & Berdo, P.C.

(57) ABSTRACT

A radio communication terminal and a radio communication system which can avoid an obstacle that is caused by a malicious wormhole while using a harmless wormhole. There are provided: a radio communication terminal in which a relay route about a certain node is stored as a backup route about the node and the backup route is changed and set as a relay route about the node in accordance with a detection of an obstacle caused by application data; and a radio communication system in which a sink node transmits a transfer destination change command in association with the change setting and a node which received the command sets a node of a transferring source of the command as a transfer destination node.

7 Claims, 9 Drawing Sheets

RADIO COMMUNICATION TERMINAL AND RADIO COMMUNICATION SYSTEM

BACKGROUND OF THE INVENTION

1. Field of the Invention

The invention relates to a radio communication terminal and a radio communication system for transmitting and receiving a packet through an adhoc multihop communication network.

2. Description of the Related Arts

Adhoc multihop communication in which by sequentially transferring packets among nodes existing in a communication range, the packets can be also transmitted to nodes out of the communication range has been known. In the adhoc multihop communication, a multihop route is constructed and managed (what is called a routing process) by a system such as DSR (Dynamic Source Routing), OLSR (Optimized Link State Routing), or AODV (Adhoc On-Demand Distance Vector).

In the case where the malicious third party provided a bypass route as what is called a wormhole for the multihop route, there is such a problem that when the node has executed the routing process, the node erroneously sets the multihop route and continues the communication without being aware of the erroneous setting. Specifically speaking, dummy terminals are set at both ends of the multihop route, the dummy terminal set at one of the ends obtains a packet and falsifies data included in the packet, and thereafter, transmits the packet obtained after the falsification to the dummy terminal set at the other end by using a high-speed communication network such as optical fiber communication network or WiMAX as a bypass route. Each of the nodes which exchange the packets, therefore, exchanges the packet including the falsified data.

If the wormhole is, for example, a simple radio wave propagating route formed by reflecting a radio wave by accident from a large-sized truck which had stopped, since it is advantageous to communicate through the wormhole, the wormhole should be actively used. If the malicious third party purposely set the wormhole as mentioned above, there occurs such an obstacle that the packet including the falsified application data is received, or when only the application data included in the packet has selectively been abandoned, in spite of a fact that the multihop route has been established, the application data cannot be received.

For example, in the following Non-Patent Literature 1, a method of restricting an arrival range of the packet on a physical space by a geographical packet leash or a temporal packet leash has been disclosed. In the following Non-Patent Literature 2, there has been disclosed a method whereby only the node existing in a predetermined range sets a common key called a local broadcast key, so that even if a wormhole is formed between the node and the node existing out of the predetermined range, an encrypting process is made to fail by a difference of the common key.

Non-Patent Literature 1

Yih-Chun Hu, Adrian Perring, David B. Johnson, "Packet Leashes: A Defence against Wormhole Attacks in Wireless Ad Hoc Network, "Proc of INFOCOM 2003, San Francisco, Calif., USA, April 2003.

Non-Patent Literature 2

L. Lazos, R. Poovendran, C. Meadows, P. Syverson, L. W. Chang, "Preventing Wormhole Attacks on Wireless Ad Hoc Networks: A Graph Theoretic Approach, "Wireless Communications and Networking Conference, 2005 IEEE, 1193-1199 Vol. 2.

With respect to a harmless wormhole, however, in spite of a fact that it is desirable to use it, according to the methods of Non-Patent Literatures 1 and 2, the harmless wormhole cannot be used.

When the method of Non-Patent Literature 1 is used, it is necessary to set a proper restriction distance parameter in accordance with a radio wave arrival distance. Since the actual radio wave arrival distance, however, changes moment to moment according to elements such as transmission-electric power, receiving sensitivity, diffraction or reflection of the radio wave, existence of an obstacle such as building, mountain, or automobile, and temperature, it is actually very difficult to match the restriction distance parameter with the radio wave arrival distance. For example, when the restriction distance is longer than the actual radio wave arrival distance, by forming the wormhole extending between a position in the actual radio wave arrival distance and a position out of the restriction distance, the data of the node existing within the restriction distance can be transmitted through the wormhole.

When the method of Non-Patent Literature 2 is used, there is such a problem that even if a certain node set the common key between the node and the node existing at a relatively far position and, thereafter, a radio wave propagation environment has been changed and a communication link between both of the nodes has been cut, the wormhole established before the communication link is cut is still valid. That is, even if the communication link is cut, the data of the node existing within the restriction distance can be transmitted through the wormhole.

The present invention has been made in consideration of the problems as mentioned above and it is an object of the invention to provide a radio communication terminal and a radio communication system, in which while using a harmless wormhole, an obstacle that is caused by a malicious wormhole can be avoided.

According to the invention, there is provided a radio communication terminal having a relay route setting part for setting a relay route of a transmission packet to one of nodes in a multihop communication network in accordance with a discrimination result which is obtained by a route searching process of the multihop communication network, a transmitting part for transmitting the transmission packet through the set relay route, a receiving part for receiving a reception packet through the multihop communication network, and an application data processing part for processing application data included in the reception packet, comprising: a backup route storing part for storing the relay route as a backup route regarding the one node; and a route change setting part for having the relay route setting part obtain the backup route from the backup route storing part in accordance with a detection of an obstacle caused due to the application data by the application data processing part and change and set the obtained backup route as the relay route regarding the one node.

According to the invention, there is provided a radio communication terminal having a transfer destination setting part for setting one of a plurality of nodes in the multihop communication network as a transfer destination node of the packet and a transfer part for transferring the packet to the transfer destination node, wherein the terminal further comprises a transfer destination forced changing part for having the transfer destination setting part set a node of a transferring source of a transfer destination change command as the transfer destination node in accordance with the transfer destination change command received through the multihop communication network.

According to the invention, there is provided a radio communication system including sink nodes for mutually transmitting and receiving packets through a multihop communication network and at least one normal node, wherein the sink node comprises: a relay route setting part for setting a relay route of a transmission packet to the one normal node in accordance with a discrimination result which is obtained by a route searching process of the multihop communication network; a transmitting part for transmitting the transmission packet through the set relay route; a receiving part for receiving a reception packet through the multihop communication network; an application data processing part for processing application data included in the reception packet; a backup route storing part for storing the relay route as a backup route regarding the one normal node; a route change setting part for having the relay route setting part change and set the backup route as a relay route regarding the one normal node in accordance with a detection of an obstacle caused due to the application data by the application data processing part; and a transfer destination change command generating part for generating a transfer destination change command indicating that a transfer destination node of a transfer packet due to the one normal node should be changed in accordance with the detection and having the transmitting part transmit the transfer destination change command to the one normal node after the relay route setting part has set the relay route, and the normal node comprises: a transfer destination setting part for setting one of a plurality of nodes in the multihop communication network as a transfer destination node of the transfer packet; a transfer part for transferring the transfer packet to the transfer destination node; and a transfer destination forced changing part for having the transfer destination setting part set a node of a transmitting source of the transfer destination change command as the transfer destination node in accordance with the transfer destination change command.

According to the invention, there is provided a radio communication terminal having a relay destination setting part for setting one of a plurality of nodes in the multihop communication network as a relay destination node of the packet and a relay part for relaying the packet to the relay destination node, wherein the terminal further comprises a relay destination forced changing part for having the relay part relay a transfer destination change command to a transmission destination node in accordance with the transfer destination change command transmitted to the transmission destination node as one of the nodes which has arrived through the multihop communication network and having the relay destination setting part set a node of a transmitting source of the transfer destination change command as the relay destination node.

According to the invention, there is provided a radio communication system in which a sink node and a normal node mutually transmit and receive packets through at least one relay node in a multihop communication network, wherein the sink node comprises: a relay route setting part for setting a relay route of a transmission packet to the normal node in accordance with a discrimination result which is obtained by a route searching process of the multihop communication network; a transmitting part for transmitting the transmission packet through the set relay route; a receiving part for receiving a reception packet through the multihop communication network; an application data processing part for processing application data included in the reception packet; a backup route storing part for storing the relay route as a backup route regarding the normal node; a route change setting part for having the relay route setting part obtain the backup route from the backup route storing part in accordance with a detection of an obstacle caused due to the application data by the application data processing part and change and set the obtained backup route as the relay route regarding the normal node; and a transfer destination change command generating part for generating a transfer destination change command indicating that a transfer destination node of a transfer packet due to the normal node should be changed in accordance with the detection and having the transmitting part transmit the transfer destination change command to the normal node after the relay route setting part has set the relay route, the relay node comprises: a relay destination setting part for setting one of a plurality of nodes in the multihop communication network as a relay destination node of the relay packet; a relay part for relaying the relay packet to the relay destination node; and a relay destination forced changing part for relaying the transfer destination change command to the normal node by the relay part in accordance with the transfer destination change command to the normal node which arrived through the multihop communication network and having the relay destination setting part set a node of a transmitting source of the transfer destination change command as the relay destination node, and the normal node comprises: a transfer destination setting part for setting one of a plurality of nodes in the multihop communication network as a transfer destination node of the transfer packet; a transfer part for transferring the transfer packet to the transfer destination node; and a transfer destination forced changing part for having the transfer destination setting part set the node of the transmitting source of the transfer destination change command as the transfer destination node in accordance with the transfer destination change command.

According to the radio communication terminal and the radio communication system of the invention, while using a harmless wormhole, an obstacle that is caused by a malicious wormhole can be avoided.

DETAILED DESCRIPTION OF THE PREFERRED EMBODIMENTS

Embodiments according to the invention will be described in detail hereinbelow with reference, to the drawings.

<First Embodiment>

Figure 1:
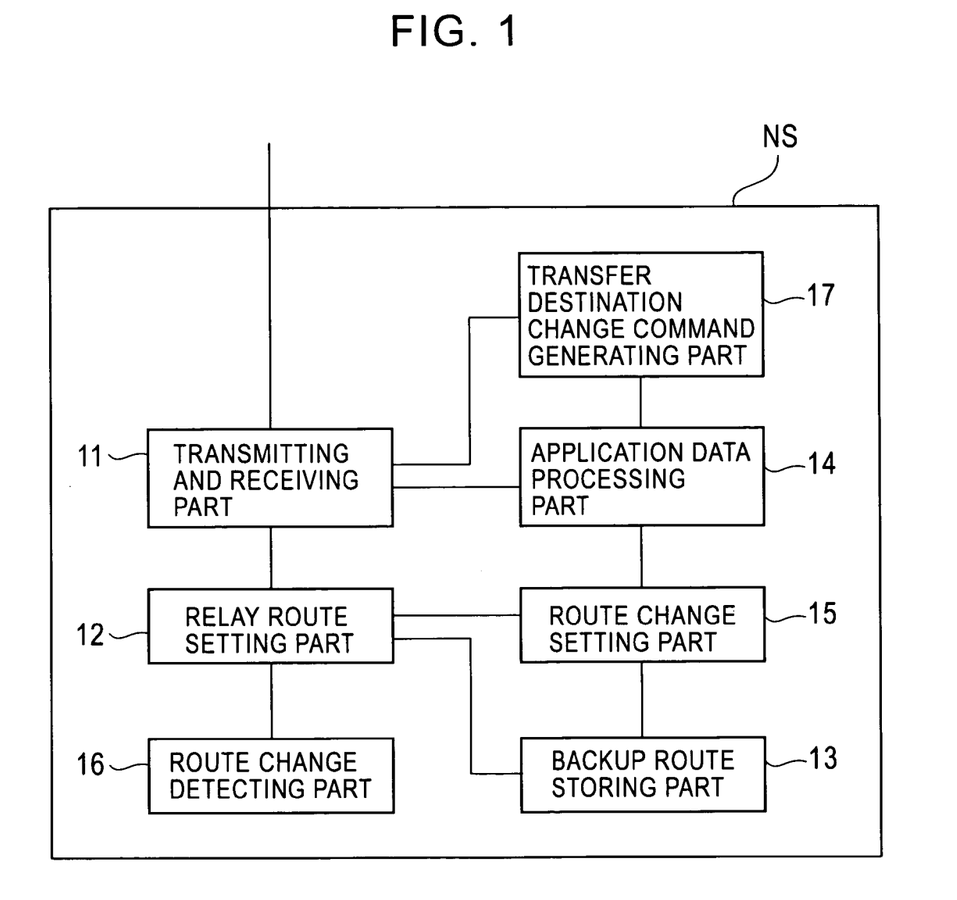
FIG. 1 is a block diagram showing a radio communication terminal as a sink node.

FIG. 1 is a block diagram showing a construction of a radio communication terminal NS according to the embodiment in the case where it functions as what is called a sink node.

The radio communication terminal NS includes: a transmitting and receiving part 11; a relay route setting part 12; a backup route storing part 13; an application data processing part 14; a route change setting part 15; a route change detecting part 16; and a transfer destination change command generating part 17. The radio communication terminal NS is a terminal such as personal computer, cellular phone, or PDA (Personal Digital Assistant) having a radio communicating function.

The transmitting and receiving part 11 is a transmitting and receiving interface for transmitting a packet through a relay route which has been set by the relay route setting part 12, which will be described hereinafter, and which exists in a multihop communication network and receiving a packet through the multihop communication network. The transmitting and receiving part 11 corresponds to a physical layer and an MAC (Media Access Control) layer in a protocol of an OSI (Open Systems Interconnection) reference model.

The relay route setting part 12 sets the relay route of the packet through the multihop communication network and corresponds to a network layer in the protocol. The relay route setting part 12 sets the relay route by a route searching method (routing algorithm) using a protocol such as DSR, OLSR, or AODV. If a route searching process is executed by, for example, the DSR or AODV, a route request (Route Request) packet and a route reply (Route Reply) packet are exchanged between the relay route setting part 12 and a node existing in a communication range, thereby setting the relay route. If the route searching process is executed by the OLSR, a hello (Hello) packet is exchanged between the relay route setting part 12 and an adjacent node, thereby setting the relay route.

The relay route setting part 12 may preset the relay route by the OLSR protocol before a transmitting request is generated and hold it as a routing table or may set the relay route and form the routing table by the DSR or AODV protocol in accordance with the generation of the transmitting request. It is assumed hereinbelow that the relay route setting part 12 executes the route searching process by the DSR protocol and sets the relay route by what is called a source routing. That is, the radio communication terminal NS as a packet transmitting source decides the relay route of the transmission packet.

The relay route setting part 12 calculates what is called a path cost regarding the node as a packet exchange target on the basis of what is called a link cost which is calculated on the basis of radio wave reception intensity, a packet reception error rate, and the like between the nodes existing in the multihop communication network by the exchange of the route request packet, route reply packet, hello packet, or the like mentioned above. The relay route setting part 12 discriminates the route in which the path cost is smallest, that is, the route in which a logical distance to the node is shortest and sets the route as an optimum relay route (hereinbelow, simply referred to as a relay route) in accordance with a discrimination result.

In the case of newly setting a relay route, that is, changing the relay route, the relay route setting part 12 forms a relay route change signal.

The backup route storing part 13 stores the relay route set by the relay route setting part 12 as a backup route at predetermined timing. At this time, the backup route storing part 13 refers to the routing table held in the relay route setting part 12 and stores the relay routes registered there. The predetermined timing denotes, for example, timing when the route change detecting part 16, which will be described hereinafter, detects that the relay route setting part 12 has executed the route searching process regarding one node existing in the multihop communication network and changed the setting of the relay route about the node. In the case, in response to the route change detection signal formed by the route change detecting part 16, the backup route storing part 13 stores the relay route as a backup route about the node before the relay route setting part 12 changes the setting. The backup route storing part 13 may store the relay route as a backup route at intermittent timing, for example, periodically as necessary. Generally, the backup route storing part 13 stores the backup routes every packet exchange target node, that is, with respect to a plurality of nodes. The backup route storing part 13 may store a plurality of backup routes for one node.

The application data processing part 14 executes a data process such as arithmetic operation or conversion to the application data included in the packet received by the transmitting and receiving part 11 and corresponds to an application layer in the protocol. For example, when the multihop communication network is a mesh type sensor network for collecting environment data, the application data processing part 14 executes the data process to the environment data.

When the data process is executed to the application data, if an obstacle that is caused by the application data is detected, the application data processing part 14 forms an error signal. For example, the application data processing part 14 discriminates whether or not an authentication code included in the application data coincides with an authentication code held in itself. If it is decided that those authentication codes do not coincide, the application data processing part 14 forms the error signal on the assumption that the obstacle caused by the application data has been detected. For example, if the application data has been falsified on the way of the communication route by the malicious third party, the authentication codes do not coincide.

The obstacle detecting method by the application data processing part 14 is not limited to the method using the authentication codes. For example, it is also possible to use a method whereby when it is determined that the application data which had periodically been received by the transmitting and receiving part 11 is not received for a predetermined period of time from a certain time point, the error signal is formed. Information for identifying the node which has transmitted the packet including the application data is included in the error signal.

In response to the error signal formed by the application data processing part 14, the route change setting part 15 allows the relay route setting part 12 to change the setting of the backup route stored in the backup route storing part 13 as a present relay route about the node shown by the error signal. The route change setting part 15 may allow the relay route setting part 12 to change the setting of the backup route as a present relay route in accordance with a route recovery input to an input part (not shown) as what is called a human interface such as a keyboard or as a communication interface associated with a remote host.

If the backup route storing part 13 stored a plurality of backup routes with respect to one node, the route change setting part 15 allows the relay route setting part 12 to change the setting of one of the backup routes as a present relay route. At this time, the route change setting part 15 selects one of the backup routes, for example, arbitrarily or in order from the small path cost and allows the relay route setting part 12 to change the setting of the selected backup route.

The route change detecting part 16 detects that the relay route setting part 12 has executed the route searching process about one node existing in the multihop communication network and has changed the setting of the relay route about the node. It is assumed that, for example, when the relay route change signal has been formed by the relay route setting part 12, the route change detecting part 16 has detected the change. The route change detecting part 16 forms a route change detection signal in response to the detection.

In response to the error signal formed by the application data processing part 14, the transfer destination change command generating part 17 forms a transfer destination change command indicating that a transfer destination node of the transfer packet due to the node shown by the error signal should be changed. After the relay route setting part 12 set the backup route as a present relay route, the transfer destination change command generating part 17 allows the transmitting and receiving part 11 to transmit the transfer destination change command to the node.

As a constructional example by hardware, the transmitting and receiving part 11 is a radio communicating module. The relay route setting part 12, application data processing part 14, route change setting part 15, route change detecting part 16, and transfer destination change command generating part 17 are constructed by at least one microprocessor having an arithmetic operating function such as a CPU (Central Processing Unit). The backup route storing part 13 is a memory such as a RAM (Random Access Memory). An antenna for radio communication is also provided by being connected to the transmitting and receiving part 11. It is also possible to construct in such a manner that the functions of those blocks are converted into programs, the programs are stored into a storage medium such as a hard disk, and an arithmetic operating function processing apparatus such as a CPU reads out the programs and executes processes according to the programs.

Figure 2:
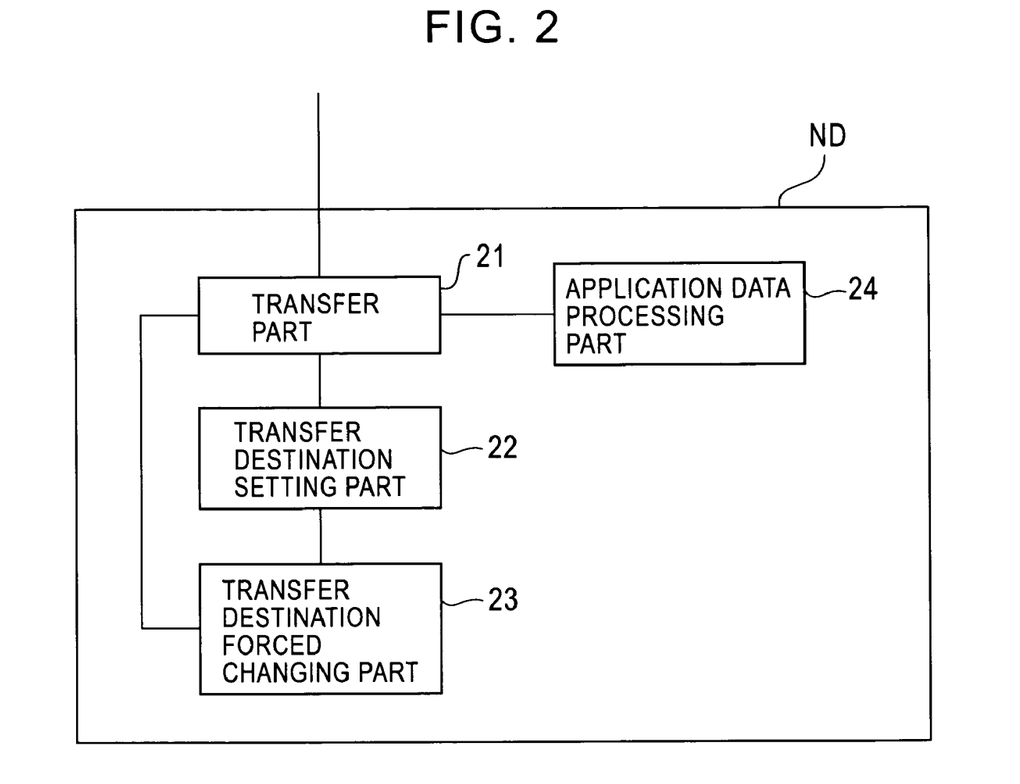
FIG. 2 is a block diagram showing a radio communication terminal as a normal node.

FIG. 2 relates to a radio communication terminal ND according to an embodiment and is a block diagram showing a construction in the case where the radio communication terminal ND functions as a node (hereinbelow, referred to as a normal node) for transmitting and receiving the packet through the relay route set by the sink node.

The radio communication terminal ND includes a transfer part 21, a transfer destination setting part 22, a transfer destination forced changing part 23, and an application data processing part 24. The radio communication terminal ND is a terminal such as personal computer, cellular phone, or PDA having the radio communicating function.

The transfer part 21 transfers the packet by radio communication to the transfer destination node set by the transfer destination setting part 22, which will be described hereinafter. The transfer part 21 corresponds to the physical layer and the MAC layer in the protocol.

The transfer destination setting part 22 sets one-hop transfer destination or a route to the sink node NS and corresponds to the network layer in the protocol. For example, when the DSR or AODV is used as a protocol, the transfer destination setting part 22 exchanges the route request packet and the route reply packet between the transfer destination setting part 22 and the node existing in the communication range, thereby setting the transfer destination node. For example, when the OLSR is used as a protocol, the hello packet is exchanged between the transfer destination setting part 22 and the adjacent node, thereby setting the transfer destination node or the transfer route. It is assumed hereinbelow that the transfer destination setting part 22 sets the transfer destination node by using the AODV as a protocol. The source routing packet transmitted by the sink node, however, is transferred to the designated transfer destination irrespective of the transfer destination setting part 22.

In response to the transfer destination change command which has been received by the transfer part 21 through the multihop communication network and in which its own terminal, that is, the radio communication terminal ND is set to a destination, the transfer destination forced changing part 23 allows the transfer destination setting part 22 to set a node of the last transferring source of the transfer destination change command as a transfer destination node to the node NS of the transmitting source. When the transfer part 21 receives the transfer destination change command by the packet, the transfer destination setting part 22 sets a node NG of the last transferring source of the transfer destination change command as a first transfer destination node at the time of transmitting the packet to the node NS of the transmitting source.

The application data processing part 24 executes a data process such as arithmetic operation or conversion to the application data such as environment data included in the packet received by the transfer part 21 and corresponds to an application layer in the protocol.

As a constructional example by hardware, the transfer part 21 is a radio communicating module. The transfer destination setting part 22, transfer destination forced changing part 23, and application data processing part 24 are constructed by at least one microprocessor having an arithmetic operating function such as a CPU (Central Processing Unit). The antenna for radio communication is also provided by being connected to the transfer part 21. It is also possible to construct in such a manner that the functions of those blocks are converted into programs, the programs are stored into a storage medium such as a hard disk, and an arithmetic operating function processing apparatus such as a CPU reads out the programs and executes processes according to the programs having been read. Each of radio communication terminals NA to NC and NE to NG also has substantially the same construction as that of the radio communication terminal ND.

Figure 3:
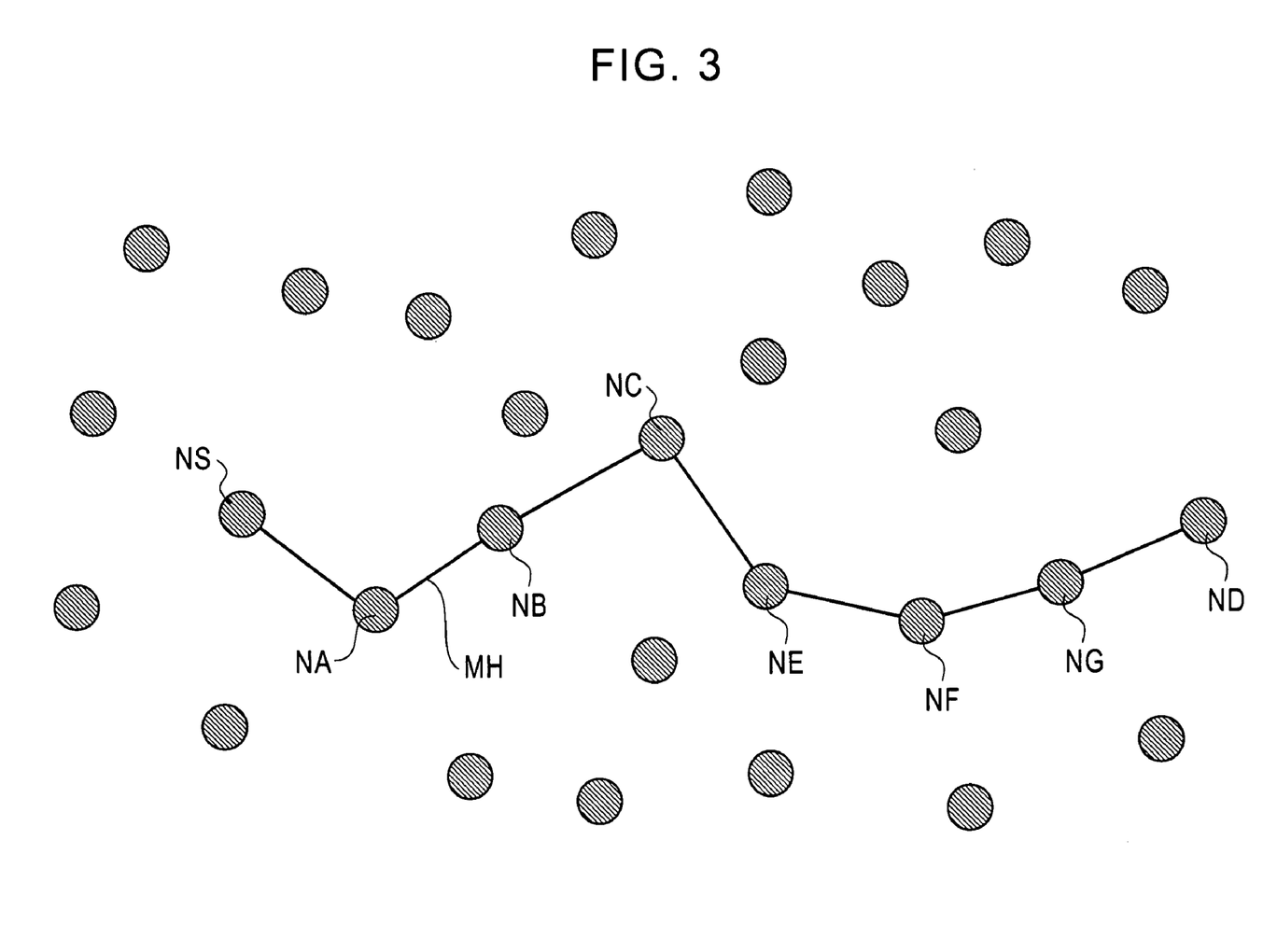
FIG. 3 is a diagram showing the radio communication terminals together with a multihop relay route.

FIG. 3 is a diagram showing the radio communication terminals (NA to NG, NS, etc.) together with a multihop relay route MH (shown by a solid line). The multihop relay route MH is a relay route set between the radio communication terminal NS and the radio communication terminal ND as a normal node by a source routing process by the radio communication terminal NS as a sink node. The radio communication terminal NS and the radio communication terminal ND exchange the packets through the radio communication terminals NA to NC and NE to NG as relay nodes.

As illustrated in the diagram, besides the radio communication terminals NA to NC and NE to NG, radio communication terminals which can become relay nodes exist around the radio communication terminals NS and ND. The radio communication terminals NA to NC and NE to NG, however, are set as relay nodes so that the path cost between the radio communication terminal NS and the radio communication terminal ND is minimized by the source routing process by the radio communication terminal NS. Each of the radio communication terminals NA to NC and NE to NG as relay nodes relays the packet from one radio communication terminal adjacent to its own terminal to the other radio communication terminal without executing any special process.

Each of the radio communication terminals receives an authentication when participating in the multihop communication network and obtains a common key in the communication network. An encryption has been performed by the common key to at least a message which is transmitted and received in the network layer and an authentication code (Message Authentication Code) has been added to the message.

Figure 4:
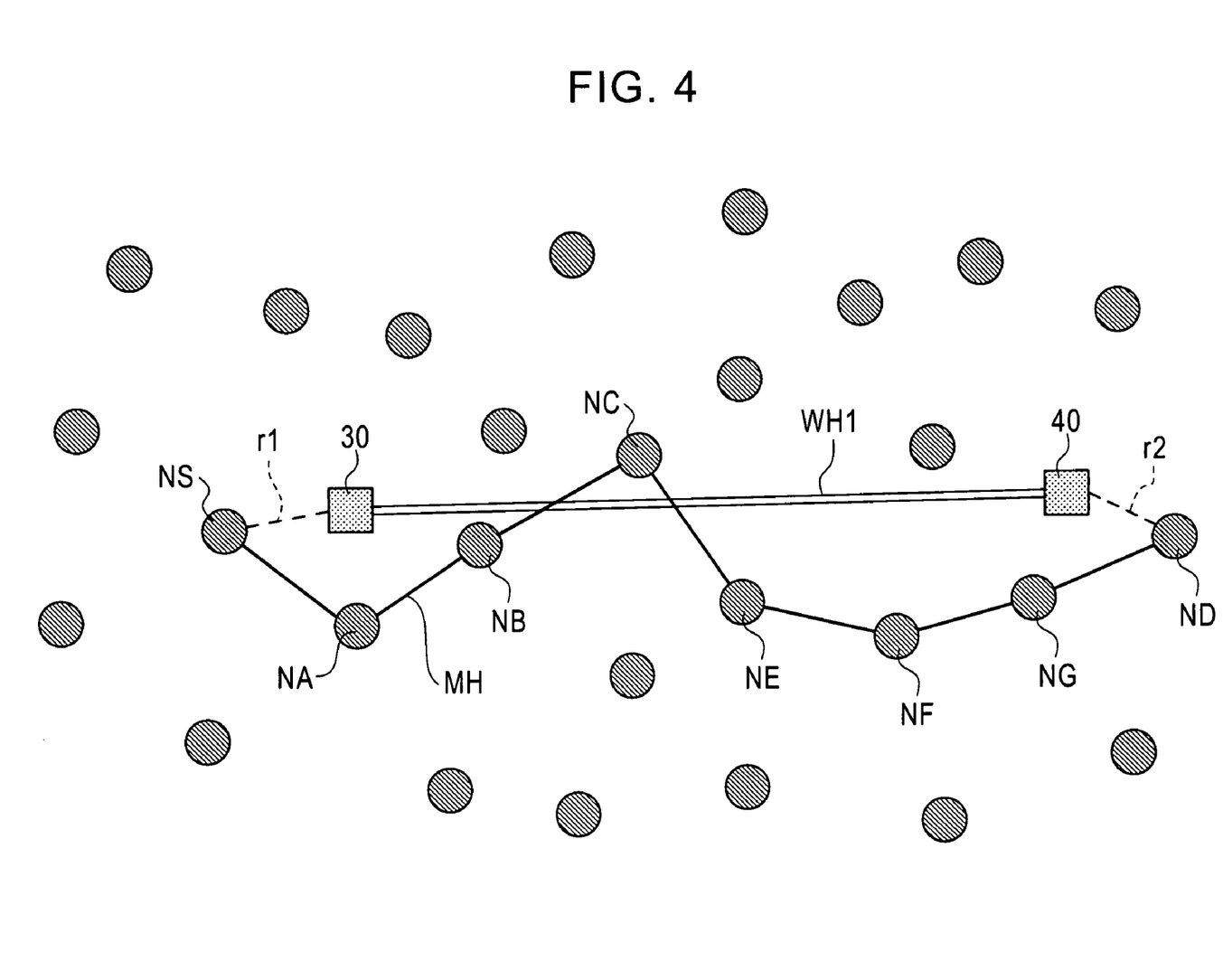
FIG. 4 is a diagram showing the radio communication terminals and the multihop relay route together with a wormhole.

FIG. 4 is a diagram showing the radio communication terminals (NA to NG, NS, etc.) and the multihop relay route MH together with a wormhole WH1. Those radio communication terminals form a multihop communication network as a mesh type sensor network for collecting, for example, the environment data. The wormhole WH1 is a bypass route in which a dummy terminal 30 is set to one end and a dummy terminal 40 is set to the other end. The dummy terminal 30 exists near the radio communication terminal NS as a sink node. The dummy terminal 40 exists near the radio communication terminal ND as a normal node.

The relay route setting part 12 of the radio communication terminal NS sets the route, as a relay route, in which the path cost between the radio communication terminal NS and the radio communication terminal ND becomes minimum by the routing algorithm. If the wormhole WH1 is formed as shown in the diagram, therefore, the relay route through the wormhole WH1 is set instead of the normal multihop relay route MH. That is, as a relay route between the radio communication terminal NS and the radio communication terminal ND, the radio communication terminal NS sets the route through a route r1, the wormhole WH1, and a route r2 by the routing algorithm.

Figure 5:
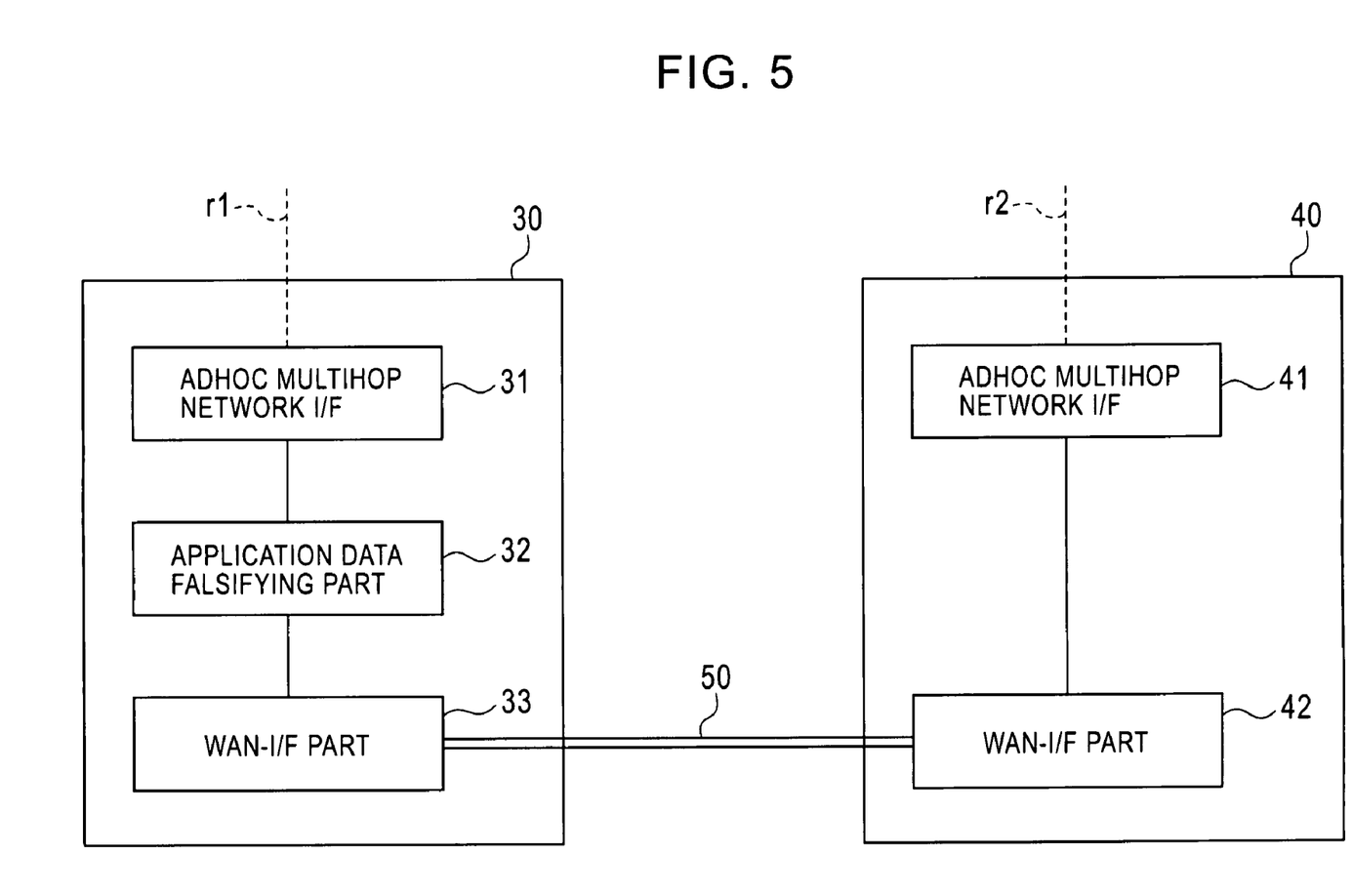
FIG. 5 is a block diagram showing dummy communicating terminals.

FIG. 5 is a block diagram showing the dummy terminals 30 and 40 together with a communication network 50 as a high-speed WAN (Wide Area Network) such as optical fiber communication network or WiMAX.

The dummy terminal 30 includes an adhoc multihop network I/F part 31, an application data falsifying part 32, and a WAN-I/F part 33. The dummy terminal 30 is a terminal such as personal computer, cellular phone, or PDA having the radio communicating function and a wire communicating function.

The adhoc multihop network I/F part 31 is a communication interface for transmitting and receiving the packet through the route r1 as a part of the multihop communication network. The adhoc multihop network I/F part 31 transmits, for example, the application data falsified by the application data falsifying part 32, which will be described hereinbelow, to the radio communication terminal NS through the route r1.

The application data falsifying part 32 falsifies, modifies, or abandons the application data included in the packet sent from the adhoc multihop network I/F part 31 or the WAN-I/F part 33, which will be described hereinafter. The application data falsifying part 32 previously holds, for example, what is called a malicious program for falsifying the application data and falsifies the packet from the I/F part (31 or 32) by the program.

The WAN-I/F part 33 is a communication interface for transmitting and receiving the packet to/from the dummy terminal 40 through the communication network 50. The WAN-I/F part 33 transmits, for example, the application data falsified by the application data falsifying part 32 to the dummy terminal 40 through the communication network 50. The WAN-I/F part 33 sends, for example, the packet received through the communication network 50 to the application data falsifying part 32.

The dummy terminal 40 includes an adhoc multihop network I/F part 41 and a WAN-I/F part 42. The dummy terminal 40 is a terminal such as personal computer, cellular phone, or PDA having the radio communicating function and the wire communicating function.

The adhoc multihop network I/F part 41 is a communication interface for transmitting and receiving the packet through the route r2 as a part of the multihop communication network. The adhoc multihop network I/F part 41 transmits and receives the packet to/from the WAN-I/F part 42, which will be described hereinbelow.

The WAN-I/F part 42 is a communication interface for transmitting and receiving the packet to/from the dummy terminal 30 through the communication network 50. The WAN-I/F part 42 transmits and receives the packet to/from the adhoc multihop network I/F part 41.

The communication network 50 is a wire communication network such as a high-speed WAN which plays a role of a bypass and corresponds to the wormhole WH1 shown in FIG. 4.

The malicious third party disposes the dummy terminal 30 near the radio communication terminal NS, disposes the dummy terminal 40 near the radio communication terminal ND, and connects the dummy terminals 30 and 40 by the communication network 50, thereby forming the wormhole WH1 as a bypass route. The application data included in the packet from the radio communication terminal ND is, consequently, falsified and transmitted to the radio communication terminal NS. The application data included in the packet from the radio communication terminal NS is falsified and transmitted to the radio communication terminal ND.

Each of the radio communication terminals NA to NG and NS according to the embodiment executes a process for avoiding the illegal falsifying action as mentioned above to the application data.

Figure 6A:
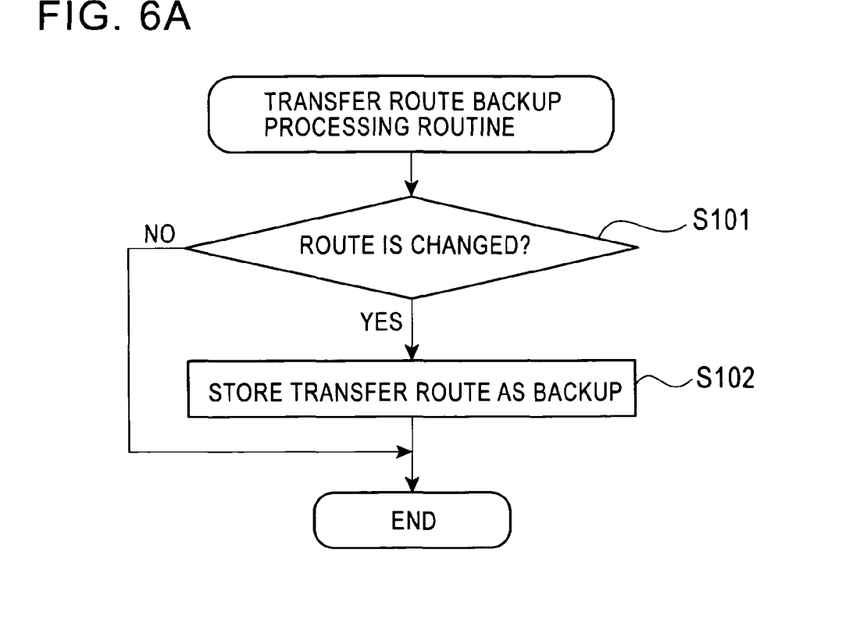
FIGS. 6A and 6B are flowcharts showing a transfer route change setting processing routine.
Figure 6B:
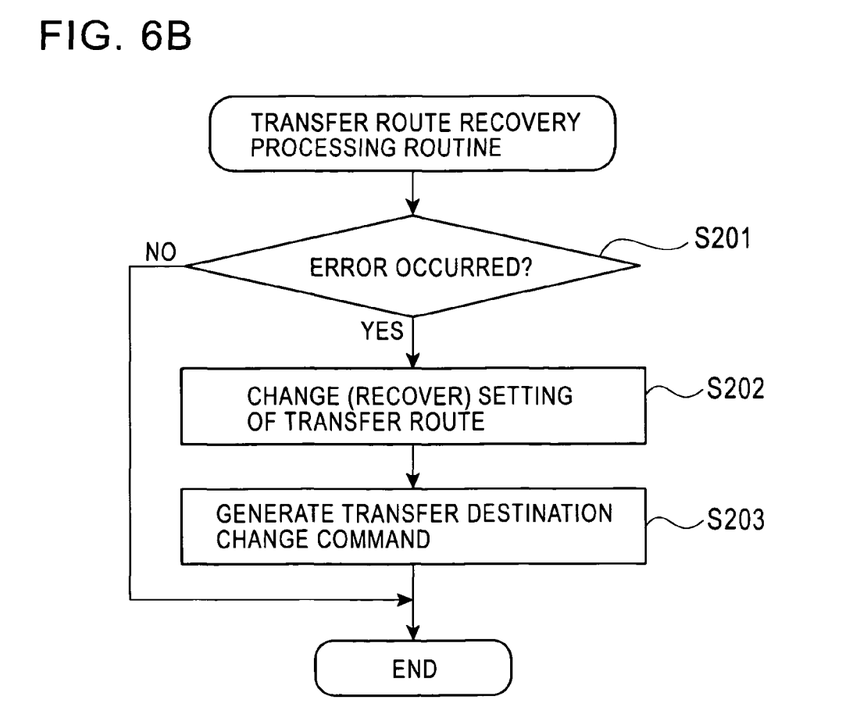

FIG. 6A is a flowchart showing a transfer route backup processing routine which is executed by the radio communication terminal NS. FIG. 6B is a flowchart showing a transfer route recovery processing routine which is executed by the radio communication terminal NS. Each of the transfer route backup processing routine and the transfer route recovery processing routine is executed in parallel at intermittent timing, for example, periodically. The transfer route backup process and the transfer route recovering process will be described hereinbelow with reference to FIGS. 4, 6A, and 6B.

The wormhole WH1 is not formed at the present point in time and, by the source routing process by the radio communication terminal NS, the multihop relay route MH as shown in FIG. 4 is set as a relay route between the radio communication terminals NS and ND by the relay route setting part 12 of the radio communication terminal NS.

The route change detecting part 16 monitors periodically, for example, every second whether or not the relay route has been changed by the source routing process by the relay route setting part 12 (step S101).

For example, it is now assumed that the wormhole WH1 as shown in FIG. 4 has been formed. The relay route setting part 12 of the radio communication terminal NS which is a sink node, sets as a relay route a route in which the path cost between the radio communication terminals NS and ND becomes minimum by the source routing process. Therefore, if the wormhole WH1 is formed as shown in the diagram, the part 12 sets, instead of the normal multihop relay route MH, a route through the route r1, the wormhole WH1, and the route r2 in which the radio communication terminal ND is recognized one hop ahead i.e., a shortest route, as a relay route between the radio communication terminals NS and ND. In this case, the relay route setting part 12 of the radio communication terminal NS transmits the packet in which the radio communication terminal ND is set as a destination, to the dummy terminal 30.

In the radio communication terminal ND which is a normal node, the transfer destination setting part 22 sets, as a relay route, a route in which the path cost between the radio communication terminals ND and NS becomes minimum. Therefore, the transfer destination setting part 22 sets the radio communication terminal NS as a radio communication terminal of the relay destination so as to relay the packet by the route through the route r2, the wormhole WH1, and the route r1 in which the radio communication terminal NS is recognized one hop ahead, i.e., the shortest route. In this case, the transfer destination setting part 22 of the radio communication terminal ND transmits the packet in which the radio communication terminal NS is set to a destination to the dummy terminal 40.

When it is detected by the relay route setting part 12 that the relay route about the radio communication terminal ND has been changed, the route change detecting part 16 generates a route change detection signal including information such as an identifier which indicates the radio communication terminal ND and is peculiar to each terminal.

In response to the route change detection signal generated by the route change detecting part 16, the backup route storing part 13 stores the multihop relay route MH as a backup route about the radio communication terminal ND before the relay route setting part 12 changes the relay route (step S102).

In parallel with the transfer route backup process mentioned above, the route change setting part 15 monitors periodically, for example, every second whether or not the error signal has been generated by the application data processing part 14 (step S201).

It is now assumed that, for example, only the application data included in the packet has selectively been falsified by the dummy terminal 30 which obtained the packet from the radio communication terminal ND through the wormhole WH1 and has been transmitted to the radio communication terminal NS. In this case, the application data processing part 14 of the radio communication terminal NS determines that, for example, the authentication code included in the application data included in the packet and the authentication code held by the part 14 itself do not coincide, and forms the error signal. The information showing the radio communication terminal ND is included in the error signal.

It is also possible to construct in such a manner that if the packet including the application data from the radio communication terminal ND has been received by the transmitting and receiving part 11 at the intermittent timing, for example, periodically, the application data processing part 14 forms the error signal when it is determined that a packet including similar application data from the radio communication terminal ND is not received by the transmitting and receiving part 11 for a predetermined period of time such as five minutes.

In accordance with the error signal formed by the application data processing part 14, the route change setting part 15 allows the relay route setting part 12 to change the setting of the backup route stored in the backup route storing part 13 as a present relay route regarding the node shown by the error signal, that is, with respect to the radio communication terminal ND (step S202). According to the above process, since the multihop relay route MH which has previously been stored as a backup route is set as a present relay route, it can be regarded as a process for recovering the backup route to the normal relay route.

In the case where a plurality of backup routes have been stored with respect to the radio communication terminal ND in the backup route storing part 13, the route change setting part 15 may allow the relay route setting part 12 to change the setting of one of the backup routes as a present relay route. In this instance, the route change setting part 15 preferentially selects, for example, the backup route in which the path cost is smallest and, if it is determined that there is an inconvenience in the communication that is made through the route, the route change setting part 15 selects another backup route and allows the relay route setting part 12 to change the setting of it.

The radio communication terminal NS, thus, can transmit the packet in which the radio communication terminal ND is set to a destination to the radio communication terminal NA and transmit it to the radio communication terminal ND through the multihop relay route MH. The route change setting part 15 may allow the relay route setting part 12 to change the setting of the backup route as a present relay route in accordance with a route recovery input to an input unit (not shown) such as a keyboard by the owner of the radio communication terminal ND.

In response to the error signal formed by the application data processing part 14, subsequently, the transfer destination change command generating part 17 forms a transfer destination change command indicating that the node shown by the error signal, that is, the transfer destination node of the transfer packet by the radio communication terminal ND should be changed. After the relay route setting part 12 set the backup route as a present relay route, the transfer destination change command generating part 17 allows the transmitting and receiving part 11 to transmit the transfer destination change command to the radio communication terminal ND (step S203). Since the relay route setting part 12 has set the multihop relay route MH as a relay route, the transfer destination change command is transmitted to the radio communication terminal ND through the radio communication terminals NA to NC and NE to NG as relay nodes. The transfer destination change command is transmitted and received by the packet.

Figure 7:
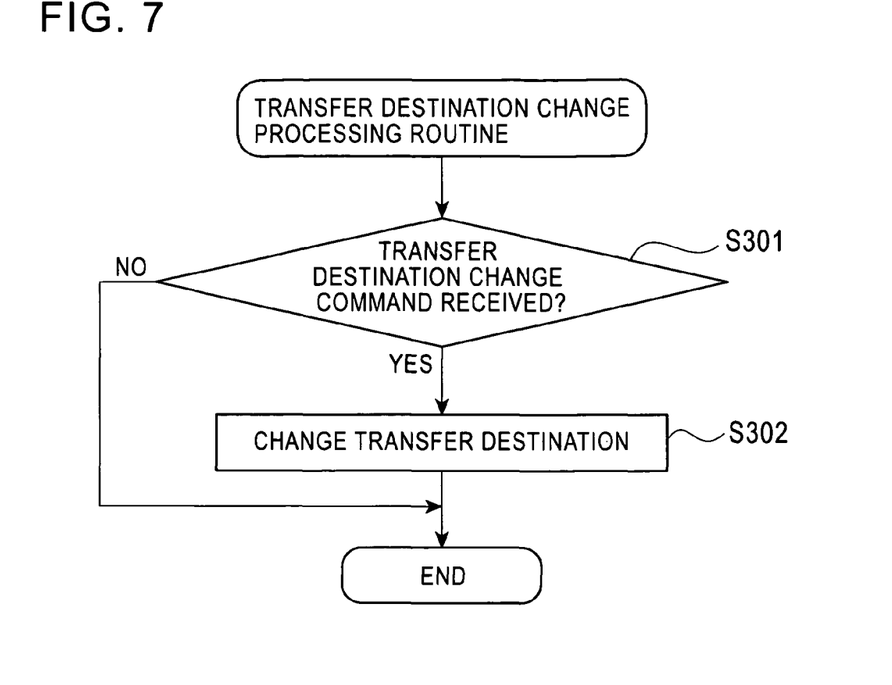
FIG. 7 is a flowchart showing a transfer destination change processing routine.

FIG. 7 is a flowchart showing a transfer destination change processing routine which is executed by the radio communication terminal ND. As mentioned above, the transfer destination setting part 22 of the radio communication terminal ND sets in such a manner that the packet in which the radio communication terminal NS is set to a destination is transmitted to the dummy terminal 40.

The transfer destination forced changing part 23 of the radio communication terminal ND monitors whether or not the transfer part 21 has received the transfer destination change command from the radio communication terminal NS (step S301). The transfer destination change command is transferred from the radio communication terminal NG adjacent to the radio communication terminal ND to the radio communication terminal ND.

If it is determined that the transfer part 21 has received the transfer destination change command, the transfer destination forced changing part 23 allows the transfer destination setting part 22 to set the node of the transferring source of the transfer destination change command, that is, the radio communication terminal NG as a transfer destination node (step S302).

The radio communication terminal ND, consequently, can transmit the packet in which the radio communication terminal NS is set to a destination to the radio communication terminal NG and transmit it to the radio communication terminal NS through the multihop relay route MH.

As mentioned above, according to the embodiment, the radio communication terminal as a sink node stores the relay route which has been set by the source routing as a backup route prior to changing the route and, when it is detected that the application data has been falsified, the radio communication terminal changes and sets (recovers) the backup route as a present relay route. By the process as mentioned above, in the case where the falsification of the application data is not detected, that is, if the route has been changed due to the formation of the harmless wormhole, the relay route is not changed and the packet can be relayed at the shortest distance by using the wormhole. In the case where the falsification of the application data is detected, that is, if the data is attacked by the formation of the malicious wormhole by the third party, the relay route is changed and set, thereby preventing the packet from passing through the wormhole. The attack as mentioned above can be, thus, avoided.

<Second Embodiment>

Figure 8:
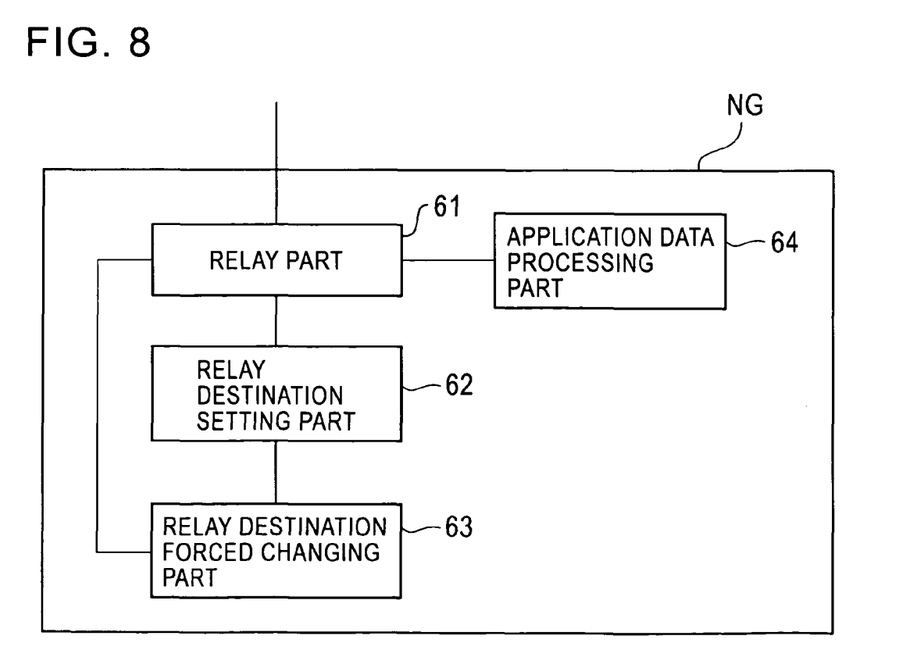
FIG. 8 is a block diagram showing a radio communication terminal as a relay node.

FIG. 8 is a block diagram showing the radio communication terminal NG as a relay node. The radio communication terminal NG includes a relay part 61, a relay destination setting part 62, a relay destination forced changing part 63, and an application data processing part 64. The radio communication terminal NG is a terminal such as personal computer, cellular phone, or PDA having the radio communicating function.

The relay part 61 transfers the packet by the radio communication to the transfer destination node set by the relay destination setting part 62, which will be described hereinbelow. The relay part 61 corresponds to the physical layer and the MAC layer in the protocol.

The relay destination setting part 62 sets the transfer destination of the packet received by the relay part 61 and corresponds to a network layer in the protocol. In the case of using, for example, the DSR or AODV as a protocol, the relay destination setting part 62 exchanges the route request packet and the route reply packet between the relay destination setting part 62 and the node existing in the communication range, thereby setting the transfer destination node. In the case of using, for example, the OLSR as a protocol, the relay destination setting part 62 exchanges the hello packet between the relay destination setting part 62 and the adjacent node, thereby setting the transfer destination node. Hereinbelow, it is assumed that the relay destination setting part 62 sets the transfer destination node by using the AODV as a protocol.

The relay destination setting part 62 holds a routing table in which the link cost and the path cost regarding the radio communication terminal NS as a sink node have been stored every radio communication terminal existing near, for example, the radio communication terminal NG and sets the radio communication terminal in which the path cost becomes minimum as a radio communication terminal of the relay destination of the packet to be transmitted to the radio communication terminal NS. As mentioned above, the relay destination setting part 62 sets the radio communication terminal of the relay destination of the packet to be transmitted to the sink node instead of executing the source routing.

In response to the transfer destination change command which has been received by the relay part 61 through the multihop communication network and in which the radio communication terminal ND is set to a destination, the relay destination forced changing part 63 allows the relay destination setting part 62 to set the node of the transmitting source of the transfer destination change command as a relay destination node. If the relay part 61 received the transfer destination change command by the packet, the relay destination setting part 62 sets the node corresponding to a transmitting source address included in a header of the packet as a relay destination node.

The application data processing part 64 executes a data process such as arithmetic operation or conversion to the application data such as environment data included in the packet received by the relay part 61 and corresponds to an application layer in the protocol.

As a constructional example by hardware, the relay part 61 is a radio communicating module. The relay destination setting part 62, the relay destination forced changing part 63, and the application data processing part 64 are constructed by at least one microprocessor having an arithmetic operating function such as a CPU (Central Processing Unit). An antenna for radio communication is also provided by being connected to the relay part 61. It is also possible to construct in such a manner that the functions of those blocks are converted into programs, the programs are stored into a storage medium such as a hard disk, and an arithmetic operating function processing apparatus such as a CPU reads out the programs and executes processes according to the programs. Each of the radio communication terminals NA to NF also has substantially the same construction as that of the radio communication terminal NG.

Figure 9:
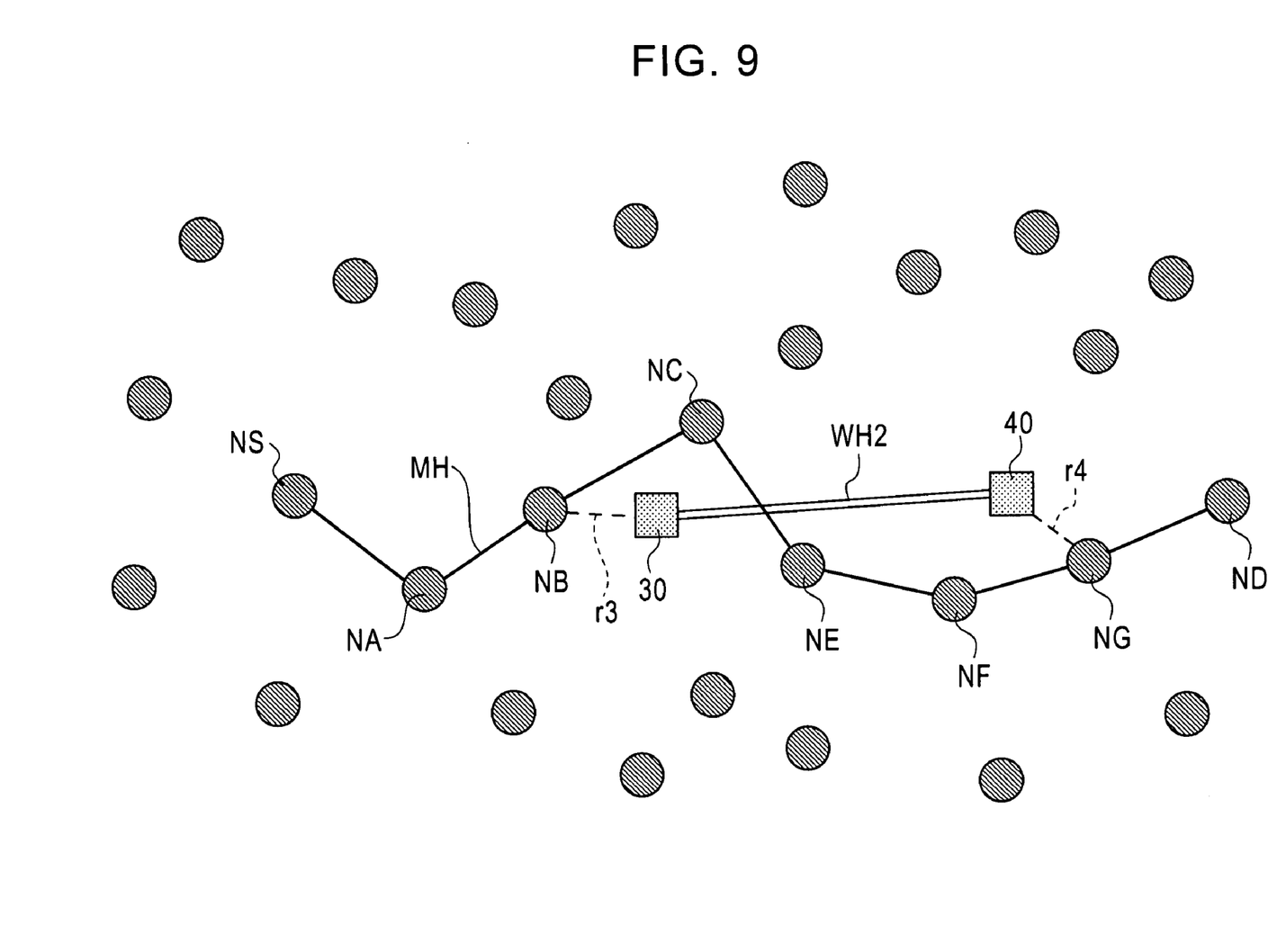
FIG. 9 is a diagram showing the radio communication terminals and the multihop relay route together with a wormhole.

FIG. 9 is a diagram showing the radio communication terminals (NA to NG, NS, etc.) and the multihop relay route MH together with a wormhole WH2. The wormhole WH2 is a bypass route in which the dummy terminal 30 is set to one end and the dummy terminal 40 is set to the other end. The dummy terminal 30 exists near the radio communication terminal NB as a relay node. The dummy terminal 40 exists near the radio communication terminal NG as a relay node.

The relay destination setting part 62 of the radio communication terminal NG sets as a relay route the route in which the path cost between the relay destination setting part 62 and the radio communication terminal NS becomes minimum. Therefore, if the wormhole WH2 is formed, the relay destination setting part 62 sets the radio communication terminal NS as a radio communication terminal of the relay destination in order to relay the packet via the route through a route r4, the wormhole WH2, and a route r3 in which the radio communication terminal NS is recognized three hops ahead, that is, the shortest route. In this case, the relay destination setting part 62 of the radio communication terminal NG transmits the packet in which the radio communication terminal NS is set to a destination to the dummy terminal 40.

Similarly the relay destination setting part 62 of the radio communication terminal NF sets as a relay route the route in which the path cost between the relay destination setting part 62 and the radio communication terminal NS becomes minimum. Therefore, the relay destination setting part 62 sets the radio communication terminal NG as a radio communication terminal of the relay destination in order to relay the packet via the route through the route r4, the wormhole WH2, and the route r3 in which the radio communication terminal NS is recognized four hops ahead, that is, the shortest route. The relay destination setting part 62 of each of the radio communication terminals NA to NE also similarly sets the relay destination.

In the embodiment, it is constructed in such a manner that each of the radio communication terminals NA to NG as relay nodes can also relay the packet to the radio communication terminal NS without passing through the wormhole WH2, that is, bypassing through the normal multihop relay route MH.

Figure 10:
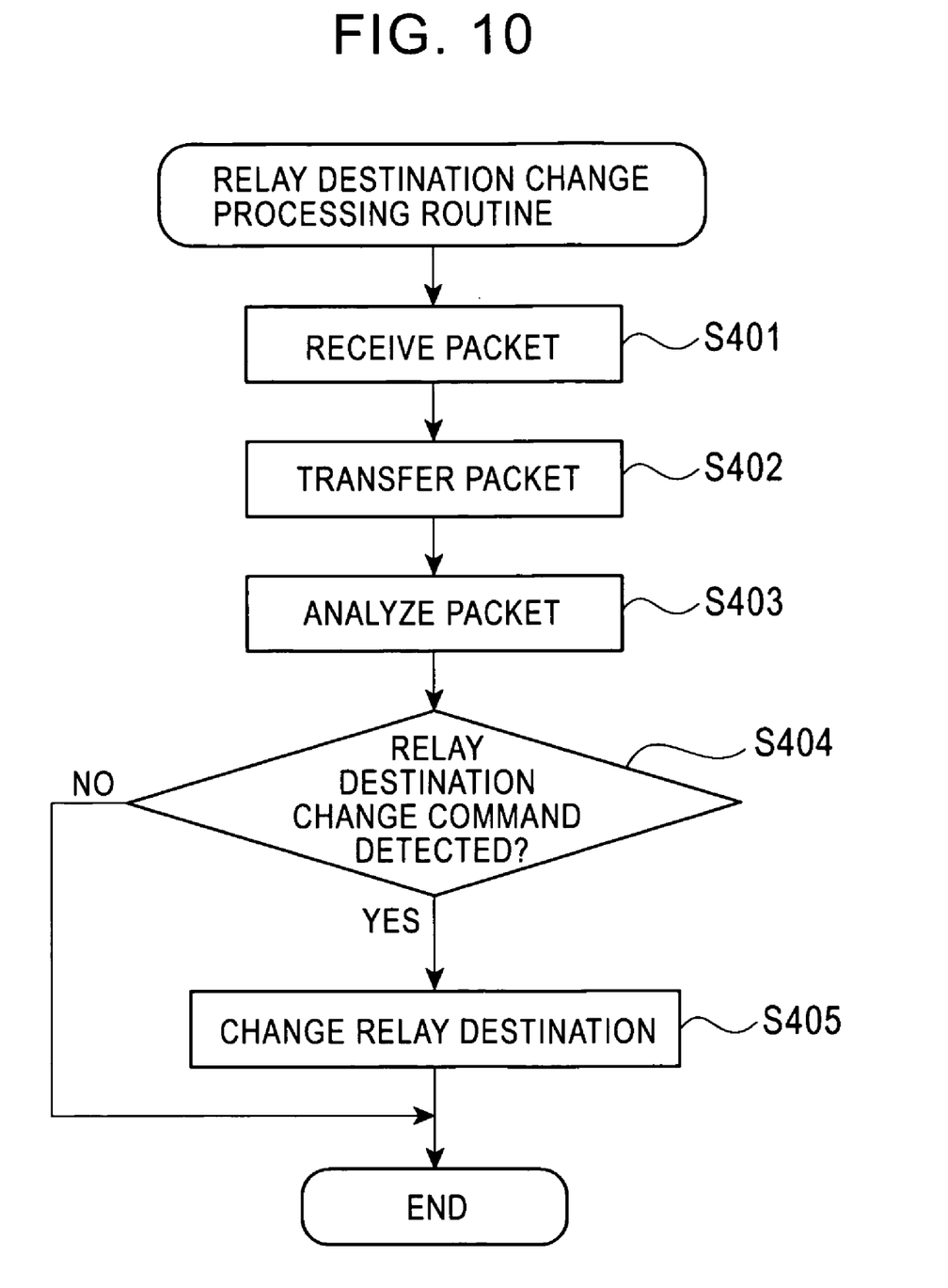
FIG. 10 is a flowchart showing a relay destination change processing routine.

FIG. 10 is a flowchart showing a relay destination change processing routine. A relay destination changing process by the radio communication terminal NG will be described hereinbelow with reference to FIG. 10.

The relay part 61 receives the packet from the radio communication terminal NF (step S401) and relays the packet to the radio communication terminal NB of the transfer destination which has been set by the relay destination setting part 62 (step S402). The transfer destination change command in which the radio communication terminal ND is set to a destination is included in the packet. The relay part 61 relays the packet in addition to the transfer destination change command.

Before the relay part 61 relays the packet, the relay destination forced changing part 63 obtains a copy of data included in the packet, analyzes the data (step S403), and discriminates whether or not the transfer destination change command is included (step S404). Since the transfer destination change command in which the radio communication terminal ND is set to a destination is included in the data of the packet, the relay destination forced changing part 63 detects it.

In response to the detection, the relay destination forced changing part 63 allows the relay destination setting part 62 to set the node of the transmitting source of the transfer destination change command, that is, the radio communication terminal NF as a relay destination node (step S405). The relay part 61 relays the packets received after the setting to the radio communication terminal NF.

The processes mentioned above are the processes which are executed in the radio communication terminal NG. Each of the radio communication terminals NA to NF also executes similar processes. The radio communication terminal NF, therefore, sets the radio communication terminal NE as a radio communication terminal of the relay destination. Likewise, the radio communication terminal NE sets the radio communication terminal NC; the radio communication terminal NC sets the radio communication terminal NB; the radio communication terminal NB sets the radio communication terminal NA; and the radio communication terminal NA sets the radio communication terminal NS, respectively. Each of the radio communication terminals NA to NG as relay nodes, consequently, can also relay the packet to the radio communication terminal NS as a sink node through the normal multihop relay route MH without passing through the wormhole WH2.

Although the relay destination changing process has been described above with respect to the example in the case where after the relay part 61 relayed the packet, the relay destination forced changing part 63 has analyzed the copy data, it is also possible to construct in such a manner that before the relay part 61 relays the packet, the relay destination forced changing part 63 analyzes whether or not the transfer destination change command is included in the data of the packet. In the case, when the relay destination forced changing part 63 detects the transfer destination change command, the relay destination setting part 62 sets the node of the transmitting source of the transfer destination change command as a relay destination node and transmits the packet to the relay destination node.

As mentioned above, according to the radio communication terminal of the embodiment, when it is detected that the transfer destination change command is included in the reception packet, the radio communication terminal of the transmitting source of the reception packet is set as a relay destination node. Since the radio communication terminal as a relay node, consequently, can also transmit the packet through the normal relay route instead of the wormhole, the attack by the malicious third party can be avoided.

This application is based on Japanese Patent Application No. 2009-054814 which is incorporated herein by reference.

What is claimed is:

1. A radio communication terminal having a relay route setting part for setting a relay route of a transmission packet to one of nodes in a multihop communication network in accordance with a discrimination result which is obtained by a route searching process of said multihop communication network, a transmitting part for transmitting said transmission packet through said set relay route, a receiving part for receiving a reception packet through said multihop communication network, and an application data processing part for processing application data included in said reception packet, comprising:
    a backup route storing part for storing said relay route as a backup route regarding said one node;
    a route change setting part for obtaining said backup route from said backup route storing part from said relay route setting part in accordance with a detection of an obstacle by said application data processing part and changing and setting the obtained backup route as said relay route regarding said one node; and
    a transfer destination change command generating part for generating a transfer destination change command indicating that a transfer destination node of the transfer packet due to said one node should be changed in accordance with the detection of the obstacle by said application data processing part and transmitting said transfer destination change command from said transmitting part to said one node after said relay route setting part has set said relay route.

2. A terminal according to claim 1, further comprising a route change detecting part for detecting the change setting of said relay route in accordance with the discrimination result of said route searching process by said relay route setting part,
    and wherein said backup route storing part stores said relay route as a backup route of said one node before said relay route setting part performs said change setting in accordance with the detection by said route change detecting part.

3. A terminal according to claim 1, further comprising an input part for receiving a route recovery input,
    and wherein said route change setting part further includes change setting means for having said relay route setting part change and set said backup route as said relay route regarding said one node in accordance with said route recovery input.

4. A terminal according to claim 1, further comprising:
    a transfer destination setting part for setting one of a plurality of nodes in the multihop communication network as a transfer destination node of the packet; and
    a transfer part for transferring said packet to said transfer destination node,
    wherein said terminal further includes a transfer destination forced changing part for setting a node of a transferring source of a transfer destination change command as said transfer destination node from said transfer destination setting part in accordance with the transfer destination change command received through said multihop communication network.

5. A radio communication system including a sink node for mutually transmitting and receiving packets through a multihop communication network and at least one normal node, wherein said sink node comprises:
    a relay route setting part for setting a relay route of a transmission packet to said one normal node in accordance with a discrimination result which is obtained by a route searching process of said multihop communication network;
    a transmitting part for transmitting said transmission packet through said set relay route;
    a receiving part for receiving a reception packet through said multihop communication network;
    an application data processing part for processing application data included in said reception packet;

a backup route storing part for storing said relay route as a backup route regarding said one normal node;

a route change setting part for having said relay route setting part change and set said backup route as a relay route regarding said one normal node in accordance with a detection of an obstacle caused due to said application data by said application data processing part; and a transfer destination change command generating part for generating a transfer destination change command indicating that a transfer destination node of a transfer packet due to said one normal node should be changed in accordance with said detection and having said transmitting part transmit said transfer destination change command to said one normal node after said relay route setting part has set said relay route, and said normal node comprises:

a transfer destination setting part for setting one of a plurality of nodes in said multihop communication network as a transfer destination node of the transfer packet;

a transfer part for transferring said transfer packet to said transfer destination node; and a transfer destination forced changing part for having said transfer destination setting part set a node of a transmitting source of said transfer destination change command as said transfer destination node in accordance with said transfer destination change command.

6. A terminal according to claim 1, further comprising:

a relay destination setting part for setting one of a plurality of nodes in the multihop communication network as a relay destination node of the packet; and a relay part for relaying said packet to said relay destination node, and wherein said terminal further includes a relay destination forced changing part for having said relay part relay a transfer destination change command to a transmission destination node in accordance with said transfer destination change command transmitted to the transmission destination node as one of said nodes which arrived through said multihop communication network and having said relay destination setting part set a node of a transmitting source of said transfer destination change command as said relay destination node.

7. A radio communication system in which a sink node and a normal node mutually transmit and receive packets through at least one relay node in a multihop communication network, wherein said sink node comprises:

a relay route setting part for setting a relay route of a transmission packet to said normal node in accordance with a discrimination result which is obtained by a route searching process of said multihop communication network;

a transmitting part for transmitting said transmission packet through said set relay route;

a receiving part for receiving a reception packet through said multihop communication network;

an application data processing part for processing application data included in said reception packet;

a backup route storing part for storing said relay route as a backup route regarding said normal node;

a route change setting part for having said relay route setting part obtain said backup route from said backup route storing part in accordance with a detection of an obstacle caused due to said application data by said application data processing part and change and set the obtained backup route as the relay route regarding said normal node; and a transfer destination change command generating part for generating a transfer destination change command indicating that a transfer destination node of a transfer packet due to said normal node should be changed in accordance with said detection and having said transmitting part transmit said transfer destination change command to said normal node after said relay route setting part has set said relay route, said relay node comprises:

a relay destination setting part for setting one of a plurality of nodes in said multihop communication network as a relay destination node of the relay packet;

a relay part for relaying said relay packet to said relay destination node; and a relay destination forced changing part for relaying said transfer destination change command to said normal node by said relay part in accordance with said transfer destination change command transmitted to said normal node which arrived through said multihop communication network and having said relay destination setting part set a node of a transmitting source of said transfer destination change command as said relay destination node, and said normal node comprises:

a transfer destination setting part for setting one of a plurality of nodes in said multihop communication network as a transfer destination node of the transfer packet;

a transfer part for transferring said transfer packet to said transfer destination node; and a transfer destination forced changing part for having said transfer destination setting part set the node of the transmitting source of said transfer destination change command as said transfer destination node in accordance with said transfer destination change command.

* * * * *